US010215562B2

(12) United States Patent
Ferren et al.

(10) Patent No.: US 10,215,562 B2
(45) Date of Patent: *Feb. 26, 2019

(54) PERSONALIZED PROTOTYPING

(75) Inventors: Bran Ferren, Beverly Hills, CA (US);
Edward K. Y. Jung, Bellevue, WA (US); Clarence T. Tegreene, Bellevue, WA (US)

(73) Assignee: Invention Science Find I, LLC, Bellevue, WA (US)

( * ) Notice: Subject to any disclaimer, the term of this patent is extended or adjusted under 35 U.S.C. 154(b) by 693 days.

This patent is subject to a terminal disclaimer.

(21) Appl. No.: 10/892,974

(22) Filed: Jul. 16, 2004

(65) Prior Publication Data

US 2006/0031252 A1 Feb. 9, 2006

(51) Int. Cl.
G06F 19/00 (2018.01)
G01C 11/06 (2006.01)

(52) U.S. Cl.
CPC ....................... *G01C 11/06* (2013.01)

(58) Field of Classification Search
USPC .................................... 700/98, 118
See application file for complete search history.

(56) References Cited

U.S. PATENT DOCUMENTS

| 3,860,796 A * | 1/1975 | Wallace et al. ............... 235/493 |
| 4,449,042 A | 5/1984 | Hampson et al. |
| 4,625,101 A | 11/1986 | Hinks et al. |
| 4,806,102 A | 2/1989 | Pedersen et al. |
| 4,826,713 A | 5/1989 | Cook |
| 4,929,402 A | 5/1990 | Hull |
| 5,028,769 A | 7/1991 | Claypool et al. |
| 5,109,589 A | 5/1992 | Cramer et al. |
| 5,296,691 A | 3/1994 | Waldron et al. |
| 5,481,102 A | 1/1996 | Hazelrigg, Jr. |

(Continued)

FOREIGN PATENT DOCUMENTS

GB 2328900 A * 3/1999 ............... A47F 8/00

OTHER PUBLICATIONS

Cadcam Net, An Information Service of CAD/CAM Publishing; "Applications—How Rapid Prototyping is Used in Manufacturing, Medicine, Art, and Architecture," http://www.cadcamnet.com/Sections/rapid%20prototyping/Applications.htm; printed on Mar. 4, 2004, pp. 1-6.

(Continued)

*Primary Examiner* — Mohammad Ali
*Assistant Examiner* — Sheela Rao

(57) ABSTRACT

A method for producing an item data set representing the three-dimensional configuration of an item includes accepting a first input data set, the first input data set including first data representing at least a first three-dimensional configuration of a first three-dimensional object; accepting a second input data set, the second input data set including second data representing at least a second three-dimensional configuration of a second three-dimensional object; adapting one or both of the first data input set and the second data input set to be combined to obtain an item data set representing a three-dimensional configuration of the item; and combining the first input data set and the second input data set to obtain the item data set. Other methods for producing item data sets and articles of manufacture are also disclosed.

27 Claims, 17 Drawing Sheets

(56) References Cited

U.S. PATENT DOCUMENTS

| | | | |
|---|---|---|---|
| 5,552,995 | A | 9/1996 | Sebastian |
| 5,601,431 | A | 2/1997 | Howard |
| 5,666,712 | A | 9/1997 | Cvetkov |
| 5,684,713 | A | 11/1997 | Asada et al. |
| 5,705,117 | A | 1/1998 | O'Connor et al. |
| 5,755,072 | A | 5/1998 | Lingafelter |
| 5,988,862 | A | 11/1999 | Kacyra et al. |
| 6,104,311 | A | 8/2000 | Lastinger |
| 6,249,600 | B1 | 6/2001 | Reed et al. |
| 6,405,095 | B1 * | 6/2002 | Jang et al. .................... 700/118 |
| 6,460,594 | B1 | 10/2002 | Lam |
| 6,575,218 | B1 | 6/2003 | Burns et al. |
| 6,623,681 | B1 | 9/2003 | Taguchi et al. |
| 6,623,687 | B1 * | 9/2003 | Gervasi et al. ............... 264/401 |
| 6,633,789 | B1 | 10/2003 | Nikolskiy et al. |
| 6,648,645 | B1 | 11/2003 | MacDougald et al. |
| 6,654,656 | B2 | 11/2003 | Kesavadas et al. |
| 6,665,574 | B2 | 12/2003 | Farren |
| 6,671,866 | B2 | 12/2003 | Arsintescu |
| 6,691,764 | B2 | 2/2004 | Embert et al. |
| 6,701,390 | B2 | 3/2004 | Ehmann |
| 6,701,491 | B1 | 3/2004 | Yang |
| 6,701,652 | B1 | 3/2004 | McElhatton et al. |
| 6,704,694 | B1 | 3/2004 | Basdogan et al. |
| 6,807,290 | B2 * | 10/2004 | Liu et al. ..................... 382/118 |
| 6,845,463 | B2 * | 1/2005 | Oba et al. ......................... 714/1 |
| 6,905,391 | B2 | 1/2005 | Soto et al. |
| 6,867,769 | B1 | 3/2005 | Toriya et al. |
| 6,868,347 | B2 | 3/2005 | Li et al. |
| 6,915,178 | B2 | 7/2005 | O'Brien et al. |
| 6,976,627 | B1 | 12/2005 | Culp et al. |
| 6,982,115 | B2 | 1/2006 | Poulos et al. |
| 6,993,456 | B2 | 1/2006 | Brooks et al. |
| 7,013,191 | B2 | 3/2006 | Rubbert et al. |
| 7,029,275 | B2 | 4/2006 | Rubbert et al. |
| 7,044,373 | B1 | 5/2006 | Garber et al. |
| 7,075,531 | B1 | 7/2006 | Ando et al. |
| 7,139,685 | B2 | 11/2006 | Bascle et al. |
| 7,277,572 | B2 | 10/2007 | MacInnes et al. |
| 7,609,290 | B2 | 10/2009 | McEwan |
| 7,818,148 | B2 | 10/2010 | Carey |
| 2001/0029440 | A1 | 10/2001 | Kondo |
| 2001/0056309 | A1 | 12/2001 | Jain et al. |
| 2002/0010526 | A1 | 1/2002 | Ando et al. |
| 2002/0012454 | A1 | 1/2002 | Liu et al. |
| 2002/0017998 | A1 | 2/2002 | Price |
| 2002/0115373 | A1 | 8/2002 | Lazerman |
| 2002/0120356 | A1 | 8/2002 | Takahashi et al. |
| 2002/0147521 | A1 | 10/2002 | Mok et al. |
| 2002/0186216 | A1 | 12/2002 | Baumberg et al. |
| 2002/0193047 | A1 | 12/2002 | Weston |
| 2003/0136850 | A1 | 7/2003 | Yamagishi et al. |
| 2003/0218607 | A1 | 11/2003 | Baumberg |
| 2004/0002841 | A1 | 1/2004 | Mayuzumi et al. |
| 2004/0253562 | A1 | 12/2004 | Knopp |
| 2005/0043835 | A1 | 2/2005 | Christensen |
| 2005/0068182 | A1 | 3/2005 | Dunlap et al. |
| 2005/0093713 | A1 | 5/2005 | Orme |
| 2006/0004476 | A1 | 1/2006 | Ferren et al. |
| 2006/0025878 | A1 | 2/2006 | Ferren et al. |
| 2007/0148599 | A1 | 6/2007 | True |

OTHER PUBLICATIONS

Castle Island Company; "Castle Island's Worldwide Guide to Rapid Prototyping"; http://www.home.att.net/~castleisland/; bearing dates of: Jul. 30, 2003 and Feb. 23, 2004; printed on Mar. 4, 2004, pp. 1-3.
Palm, William; "Rapid Prototyping" from Penn State Learning Factory; http://www.me.psu.edu/lamancusa/rapidpro/primer/chapter2.htm; bearing dates of: May 1998 and Jul. 30, 2002; printed on Mar. 4, 2004, pp. 1-15.
U.S. Appl. No. 10/909,132, Ferren et al.
U.S. Appl. No. 10/911,819, Ferren et al.
U.S. Appl. No. 10/884,760, Ferren et al.
U.S. Appl. No. 10/892,755, Ferren et al.
PCT International Search Report; International App. No. PCT/US05/10843; dated Mar. 29, 2005.
PCT International Search Report from International Application No. PCT/US05/22883 dated Aug. 1, 2008 (4 pages total).
PCT International Search Report; International App. No. PCT/US05/08531; dated Jul. 1, 2008; pp. 1-3.
PCT International Search Report; International App. No. PCT/US05/08407; dated Jun. 25, 2008; pp. 1-3.
U.S. Appl. No. 12/592,217, Ferren et al.

* cited by examiner

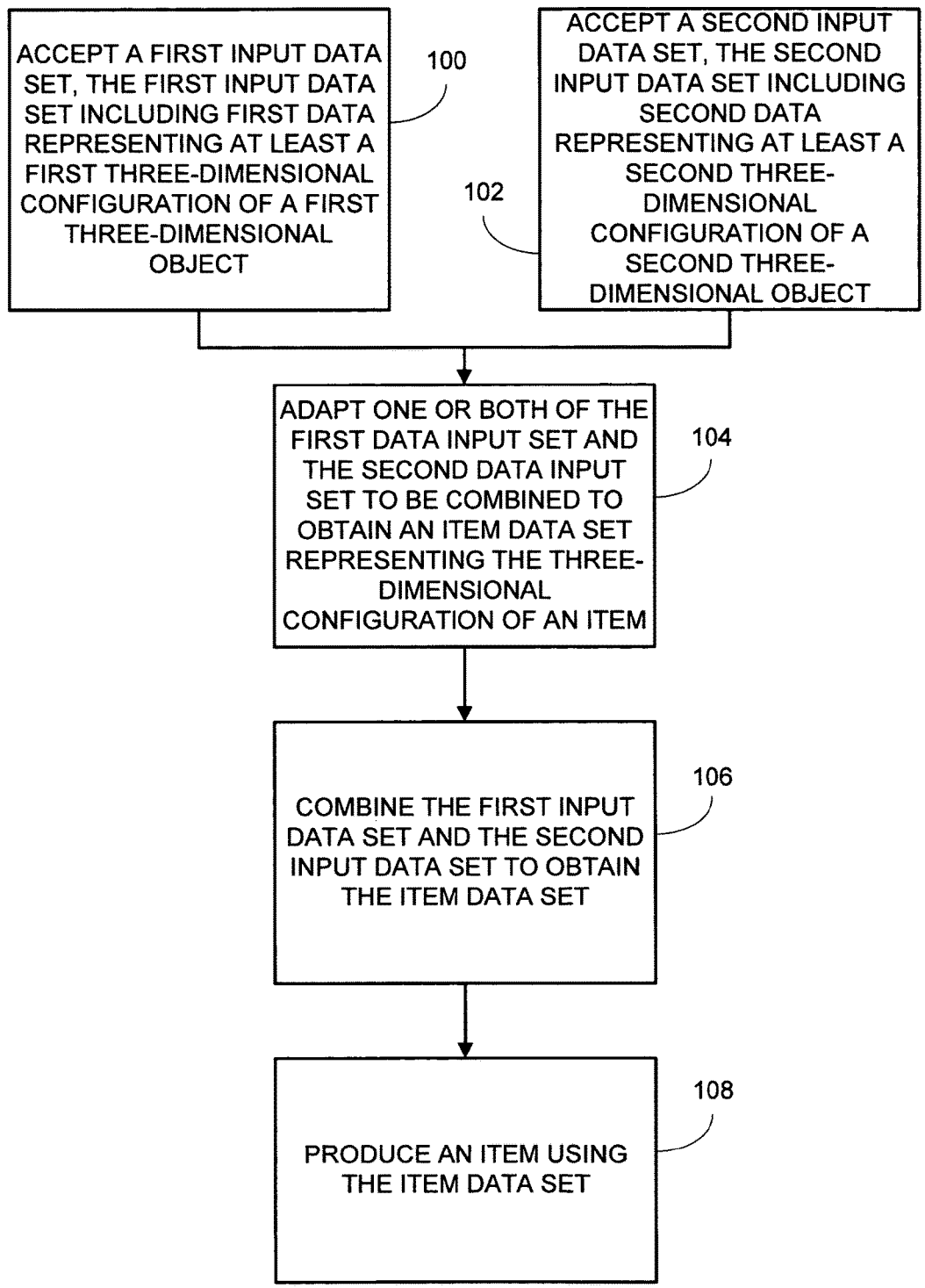

PERSONALIZED PROTOTYPING

CROSS-REFERENCE TO RELATED APPLICATIONS

1. The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).
Related Applications 2. For purposes of the USPTO extra statutory requirements, the present application constitutes a continuation-in-part of U.S. patent application Ser. No. 10/802,106, entitled EMBEDDED IDENTIFIERS, naming Bran Ferren, Edward K. Y. Jung and Clarence T. Tegreene as inventors, filed 16 Mar. 2004, which is currently co-pending or is an application of which a currently co-pending application is entitled to the benefit of the filing date.

3. For purposes of the USPTO extra statutory requirements, the present application constitutes a continuation-in-part of U.S. patent application Ser. No. 10/884,760, entitled A SYSTEM FOR MAKING CUSTOM PROTOTYPES, naming Bran Ferren, Edward K. Y. Jung and Clarence T. Tegreene as inventors, filed 2 Jul. 2004, which is currently co-pending or is an application of which a currently co-pending application is entitled to the benefit of the filing date.

4. For purposes of the USPTO extra statutory requirements, the present application constitutes a continuation-in-part of U.S. patent application Ser. No. 10/892,755, entitled CUSTOM PROTOTYPING, naming Bran Ferren, Edward K. Y. Jung and Clarence T. Tegreene as inventors, filed 16 Jul. 2004 which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD OF THE INVENTION

The subject matter of this application generally relates to creating custom data sets and custom-made articles of manufacture.

SUMMARY OF THE INVENTION

One embodiment of the subject matter of this application, a method for producing an item data set representing the three-dimensional configuration of an item, includes accepting a first input data set, the first input data set including first data representing at least a first three-dimensional configuration of a first three-dimensional object; accepting a second input data set, the second input data set including second data representing at least a second three-dimensional configuration of a second three-dimensional object; adapting one or both of the first data input set and the second data input set to be combined to obtain an item data set representing a three-dimensional configuration of the item; and combining the first input data set and the second input data set to obtain the item data set.

Another embodiment, a method for producing an item data set representing the three-dimensional configuration of an item, includes providing a first input data set from a first provider, the first input data set including first data representing at least a first three-dimensional configuration of a first three-dimensional object; accepting the first input data set; providing a second input data set from a second provider, the second input data set including second data representing at least a second three-dimensional configuration of a second three-dimensional object; accepting the second input data set; adapting the first data input set and the second data input set to be combined to obtain an item data set representing at least a three-dimensional configuration of the item; and combining the first input data set and the second input data set to obtain the item data set. The first provider and the second provider may be the same person or entity, and the either or both of the first provider and the second provider may be a customer of a business using the method or making the method available for use by a customer.

Other embodiments are described in the detailed description of the figures.

BRIEF DESCRIPTION OF THE DRAWINGS

FIG. 2 is a flow chart depicting another embodiment of the subject matter of this application;

DETAILED DESCRIPTION OF THE FIGURES

Figure 1:
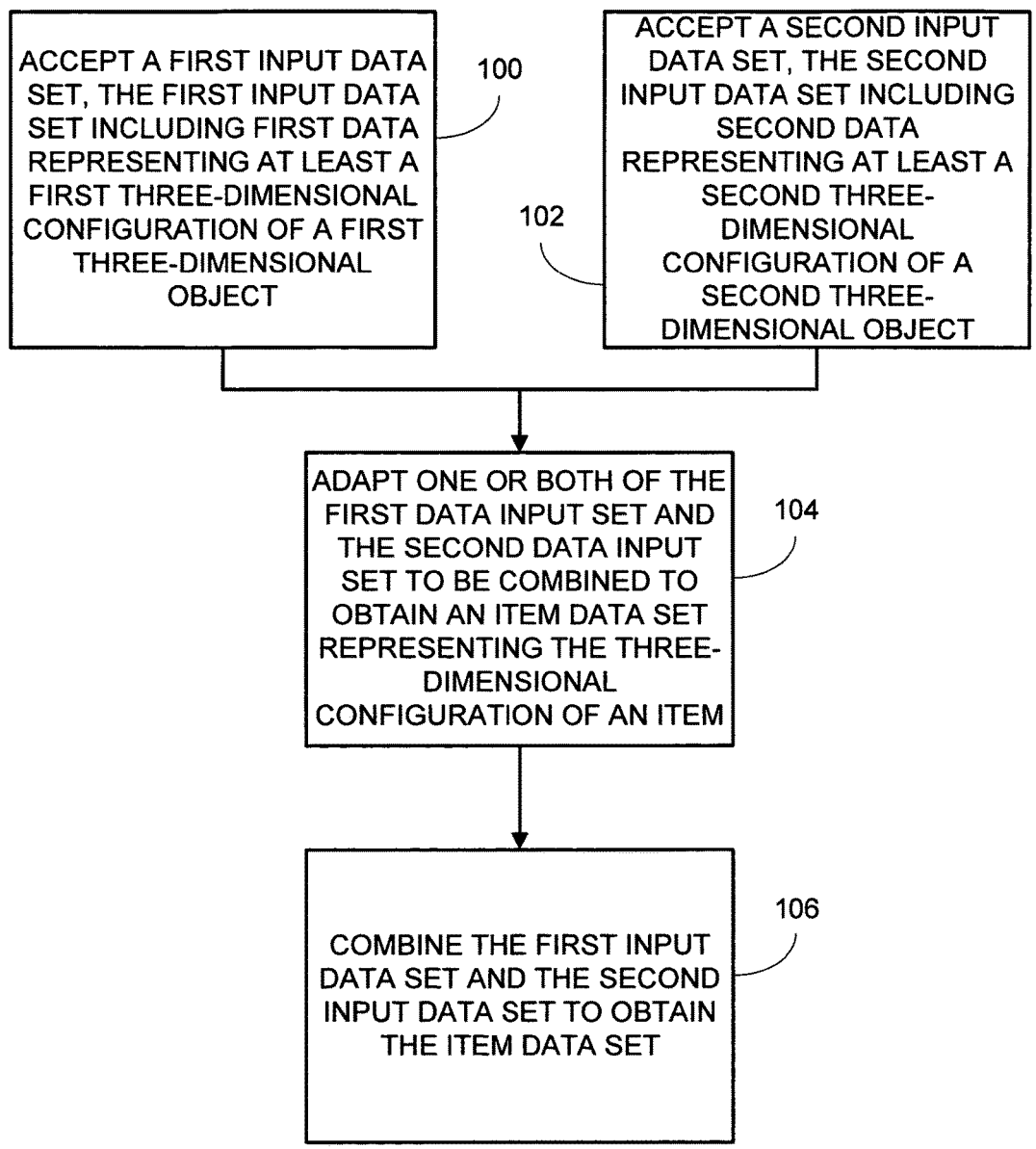
FIG. 1 is a flow chart depicting an embodiment of the subject matter of this application.

FIG. 1 shows an embodiment of the subject matter of this application, a method for producing an item data set representing the three-dimensional configuration of an item, the method including accepting a first input data set, the first input data set including first data representing at least a first three-dimensional configuration of a first three-dimensional object (e.g., the first three-dimensional object including at least a portion of a human figure; and/or items of furniture, art, decorations, books, apparel, and/or foliage; and/or items present in a kitchen, and/or items present in a bar, lights and other lighting accessories, or indoor ornaments, such as restaurant logos and signs, and/or an indoor fountain; and/or seats, lights, tables, art work, staging, decorations, or the like in an event venue) (step 100); accepting a second input data set, the second input data set including second data representing at least a second three-dimensional configuration of a second three-dimensional object (e.g., the second three-dimensional object including at least a portion of a human figure; and/or items of furniture, art, decorations, books, apparel, and/or foliage; and/or items present in a kitchen, and/or items present in a bar, lights and other lighting accessories, or indoor ornaments, such as restaurant logos and signs, and/or an indoor fountain; and/or seats, lights, tables, art work, staging, decorations, or the like in an event venue) (step 102); adapting one or both of the first data input set and the second data input set to be combined to obtain an item data set representing a three-dimensional configuration of the item (step 104); and combining the first input data set and the second input data set to obtain the item data set (step 106). Steps 100 and 102 may be performed in any order or simultaneously.

As shown in FIG. 2, another embodiment includes steps 100, 102, 104 and 106, and further includes producing the item using the item data set (step 108). This embodiment is not limited to any particular manufacturing process; the manufacturing processes include those generally known as rapid prototyping.

Figure 3:
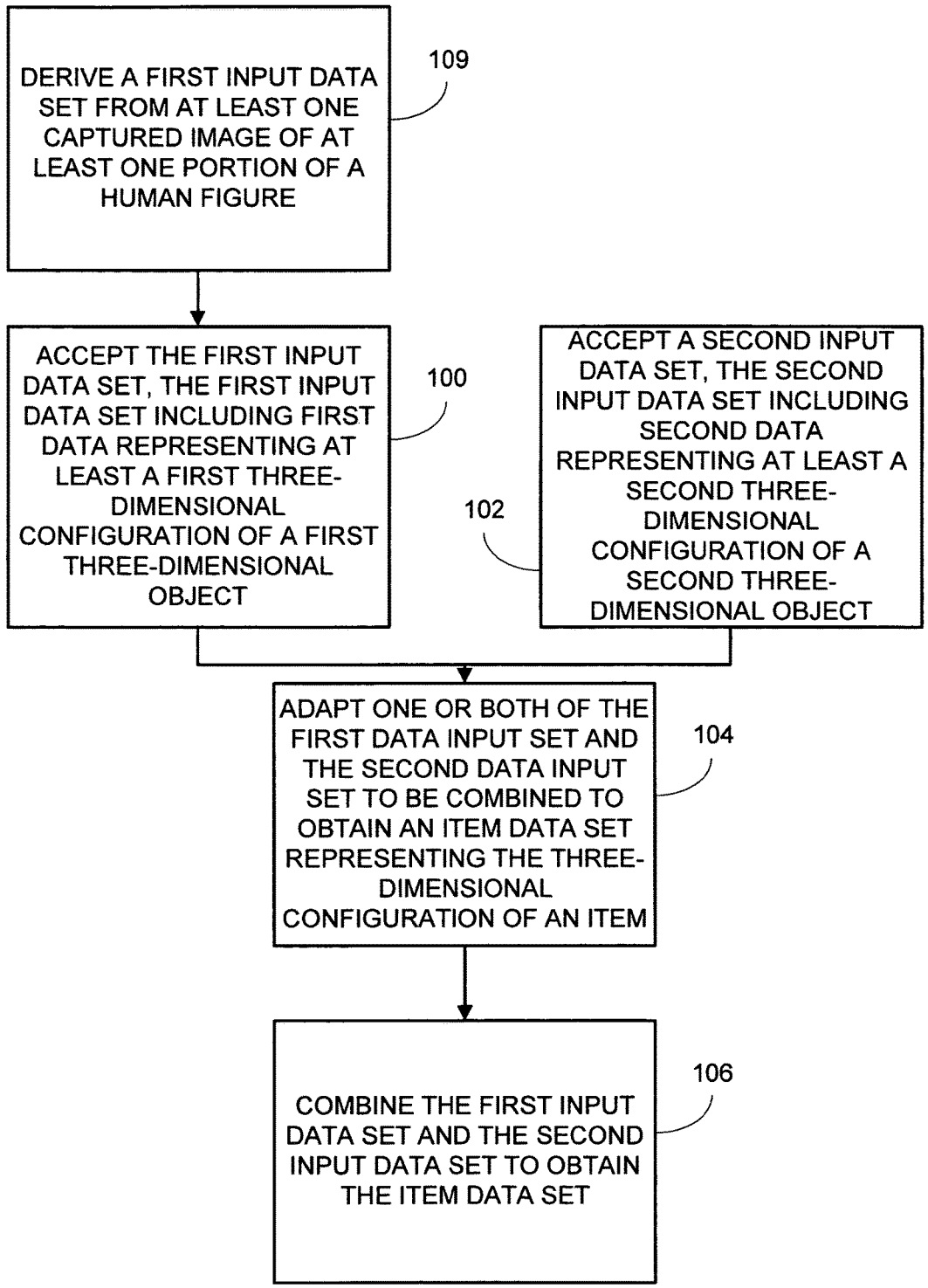
FIG. 3 is a flow chart depicting another embodiment.

As shown in FIG. 3, another embodiment includes steps 100, 102, 104 and 106, and the first three-dimensional object includes at least one portion of a human figure. Still another embodiment includes steps 100, 102, 104 and 106, and further includes deriving the first input data set from at least one captured image of at least one portion of the human figure (step 109). The captured image or images may be a photograph or photographs of any type, e.g., a digital photograph.

Figure 4:
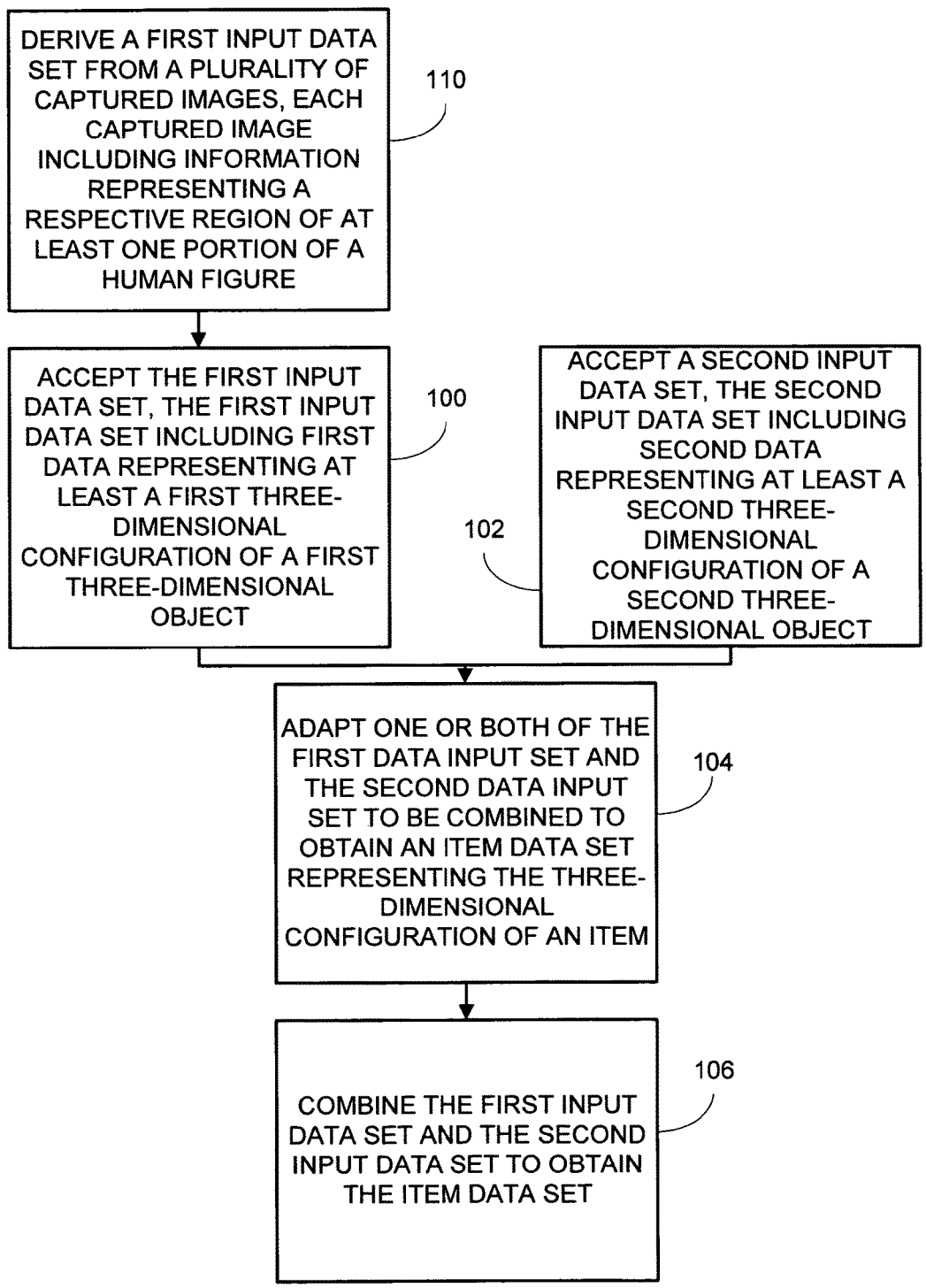
FIG. 4 is a flow chart depicting another embodiment.

Yet another embodiment, illustrated in FIG. 4, includes steps 100, 102, 104 and 106, and further includes deriving the first input data set from a plurality of captured images, each captured image including information representing a respective region of at least one portion of the human figure (step 110). These captured images may be photographs of any type, e.g., digital photographs.

Figure 5:
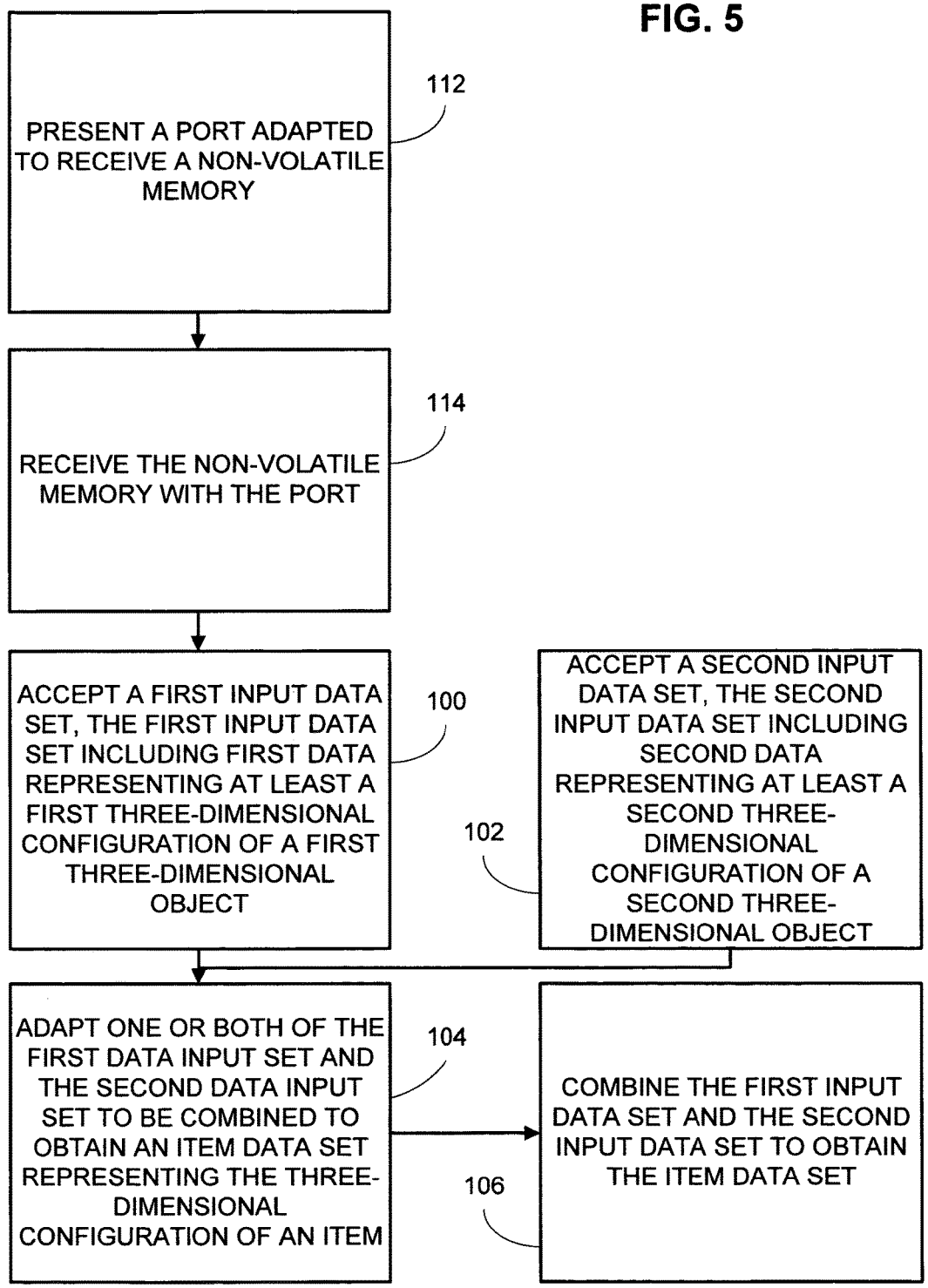
FIG. 5 is a flow chart depicting another embodiment.
Figure 6:
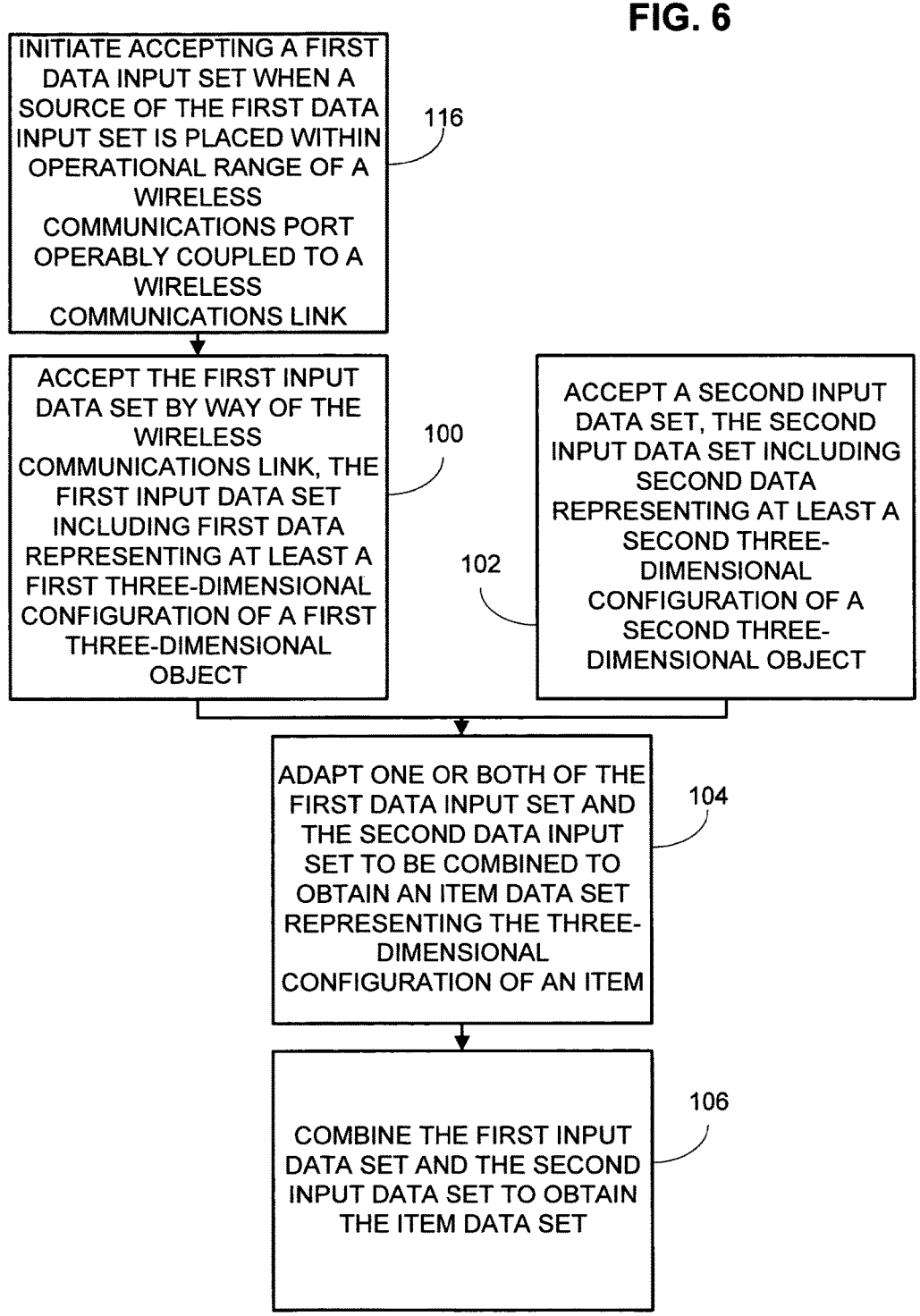
FIG. 6 is a flow chart depicting another embodiment.

FIG. 5 shows an embodiment in which the first input data set may be accepted from a memory, e.g., a non-volatile memory. This embodiment may further include presenting a port adapted to receive the non-volatile memory (step 112) and, in addition, receiving the non-volatile memory (step 114). In this embodiment, the first input data set may be accepted by way of a communications link, e.g. a wireless communications link. Where the first input data set is accepted by way of a wireless communications link, as shown in FIG. 6, step 100 may be initiated when a source of the first input data set (e.g., a laptop computer) is placed within operational range of a wireless communications port operably coupled to the wireless communications link, e.g., a wireless "hot-spot" such as those increasingly common in facilities of all types, e.g., airports and restaurants (step 116).

Figure 7:
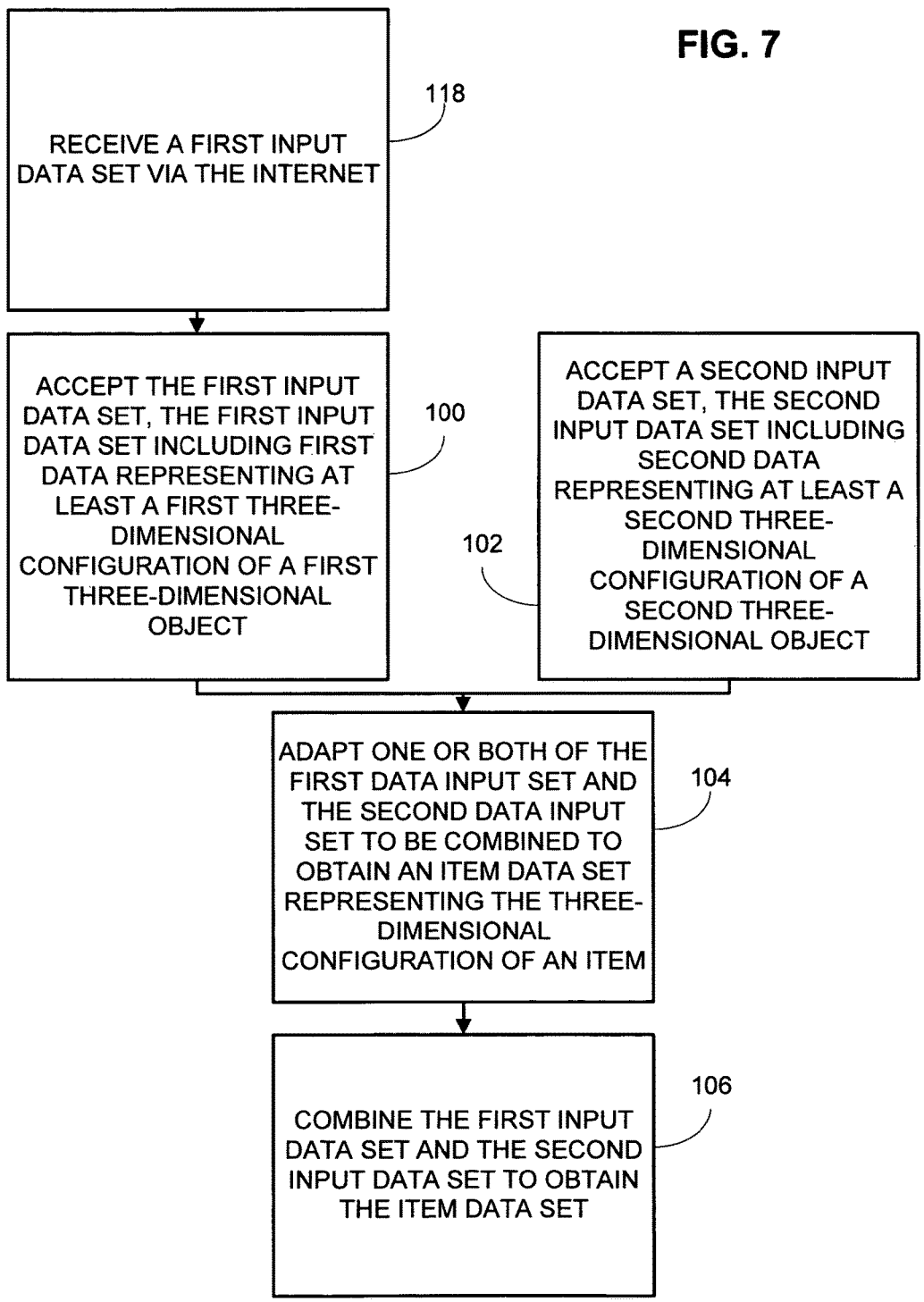
FIG. 7 is a flow chart depicting another embodiment.

FIG. 7 illustrates another embodiment in which the first input data set is received via the Internet (step 118) prior to the acceptance of the first input data set (step 100). In yet another embodiment, the first input data set is accepted via the Internet.

Figure 8:
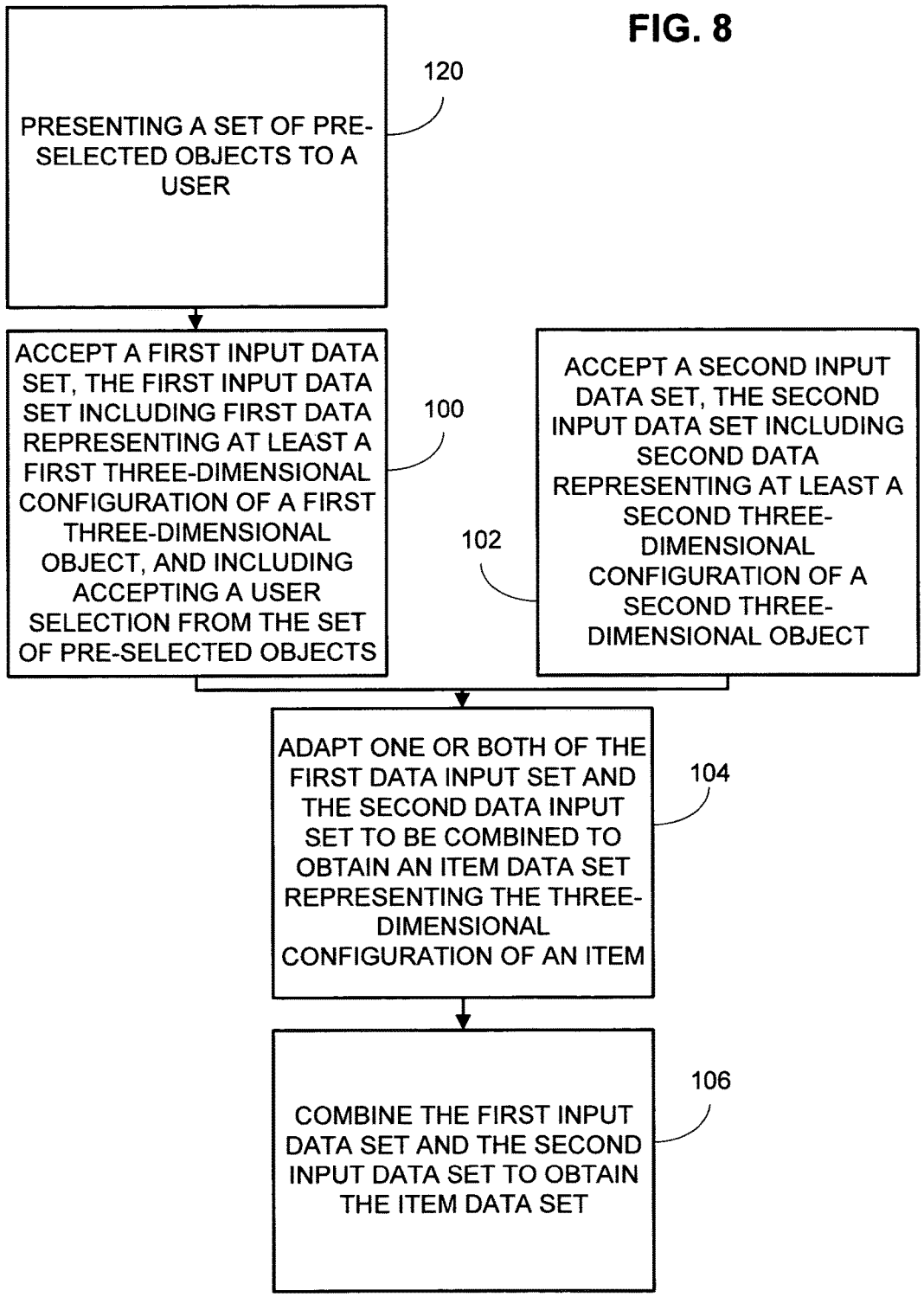
FIG. 8 is a flow chart depicting another embodiment.

Another embodiment, shown in FIG. 8, including steps 100, 102, 106 and 108 further includes presenting a set of pre-selected objects to a user (step 120), and in this embodiment, step 100 includes accepting a user selection from the set of pre-selected objects. In one approach, presenting a set of pre-selected objects may include an interactive process with a user. For example, a user interface may present a set of categories from which the user may elect one or more. The user interface may then present a set of visual images, e.g., thumbnails or full-size images from which the user can select objects.

Figure 9:
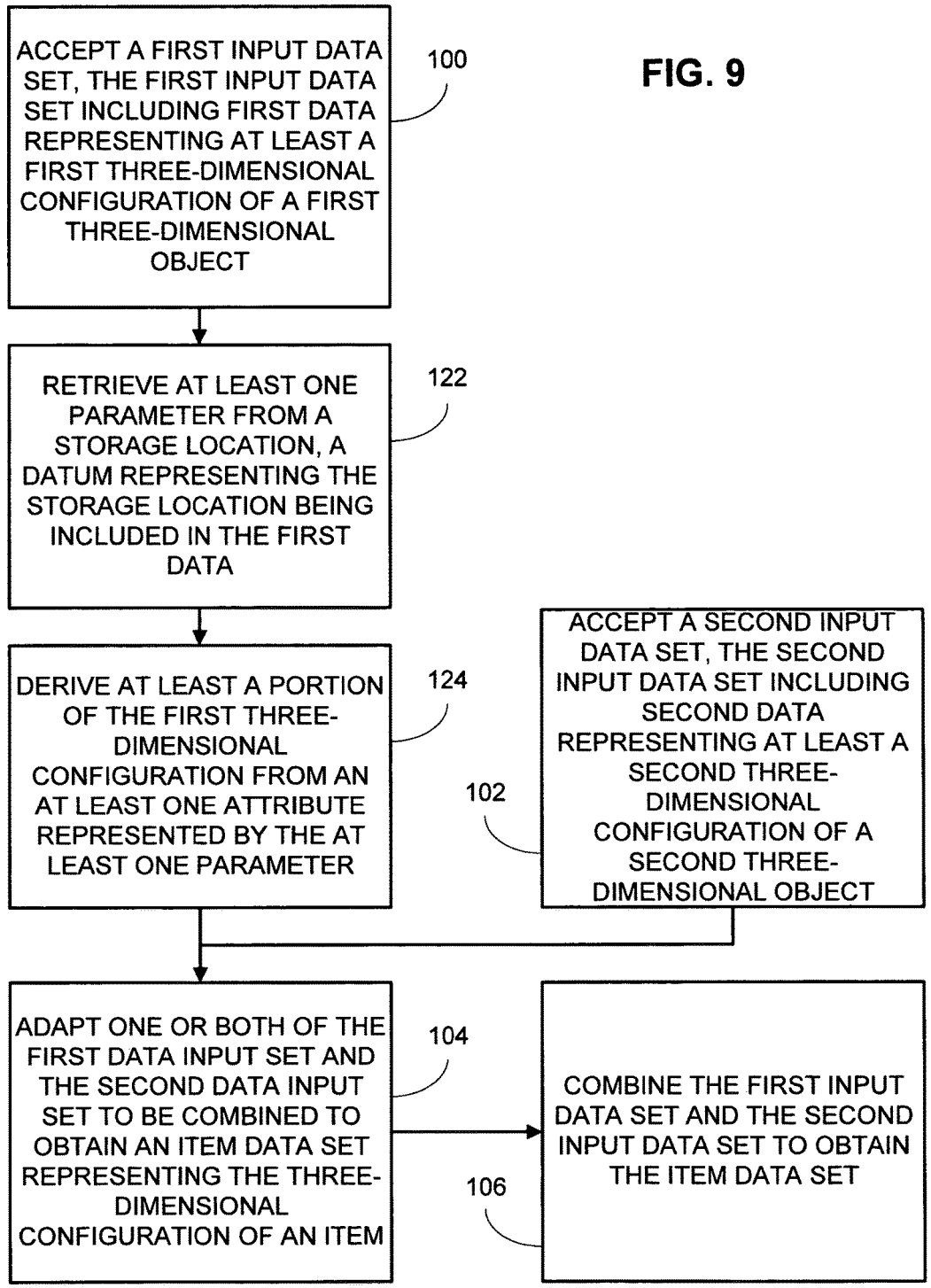
FIG. 9 is a flow chart depicting another embodiment.

In another embodiment, at least a portion of the first data directly represents the first three-dimensional configuration, e.g., the first data includes spatial coordinates of the contours of the first three-dimensional configuration. In yet another embodiment, illustrated in FIG. 9, the first data includes at least one parameter representing at least one attribute of the first three-dimensional configuration, and further including deriving the first three dimensional configuration from the at least one attribute. In this embodiment, a parameter may be a numerical representation of an attribute, where an attribute may be a dimension, a feature, or, more generally, some describable aspect of a three-dimensional object.

The first data may include at least a datum representing a storage location, e.g., in a memory, for such a parameter, and an embodiment further includes retrieving the at least one parameter from the storage location using the at least one datum (step 122) and deriving the first three-dimensional configuration from the at least one attribute (step 124).

Figure 10:
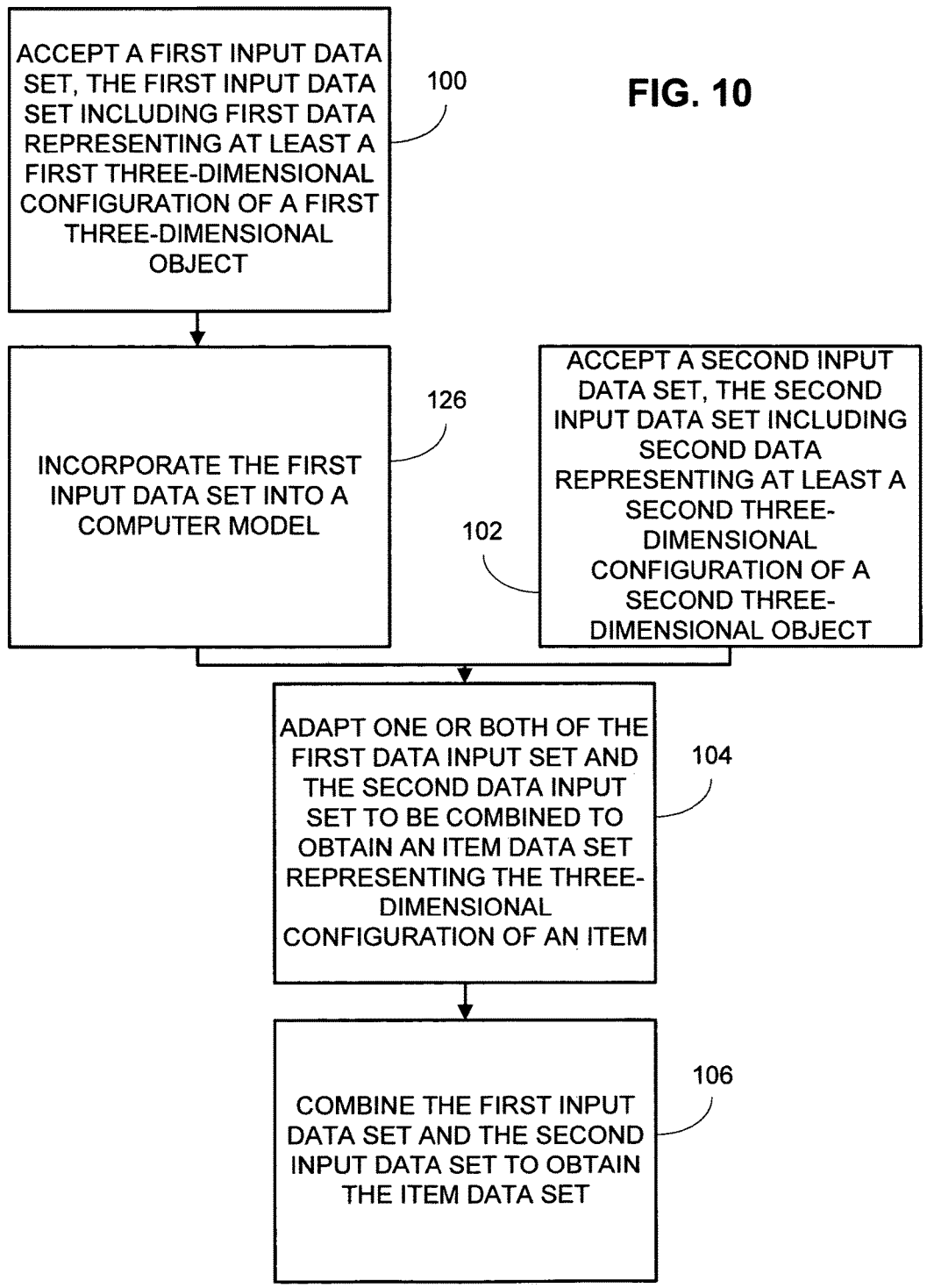
FIG. 10 is a flow chart depicting another embodiment.

As shown in FIG. 10, one embodiment includes steps 100, 102, 104 and 106, and further includes incorporating at least a portion of the first input data set into a computer model (step 126). Herein, a "computer model" is a collection of attributes as discussed above, storable in an electronic library, memory, database, and including or capable of generating any interpolations required to make mutually compatible the attributes included in the computer model. A variety of computer models are known to skilled artisans.

Various embodiments including steps 100, 102, 104 and 106 may include one or more steps and features, described here for illustrative purposes in detail in conjunction with first input data set or the first data, with regard to one or both of the second input data set or the second data.

Figure 11:
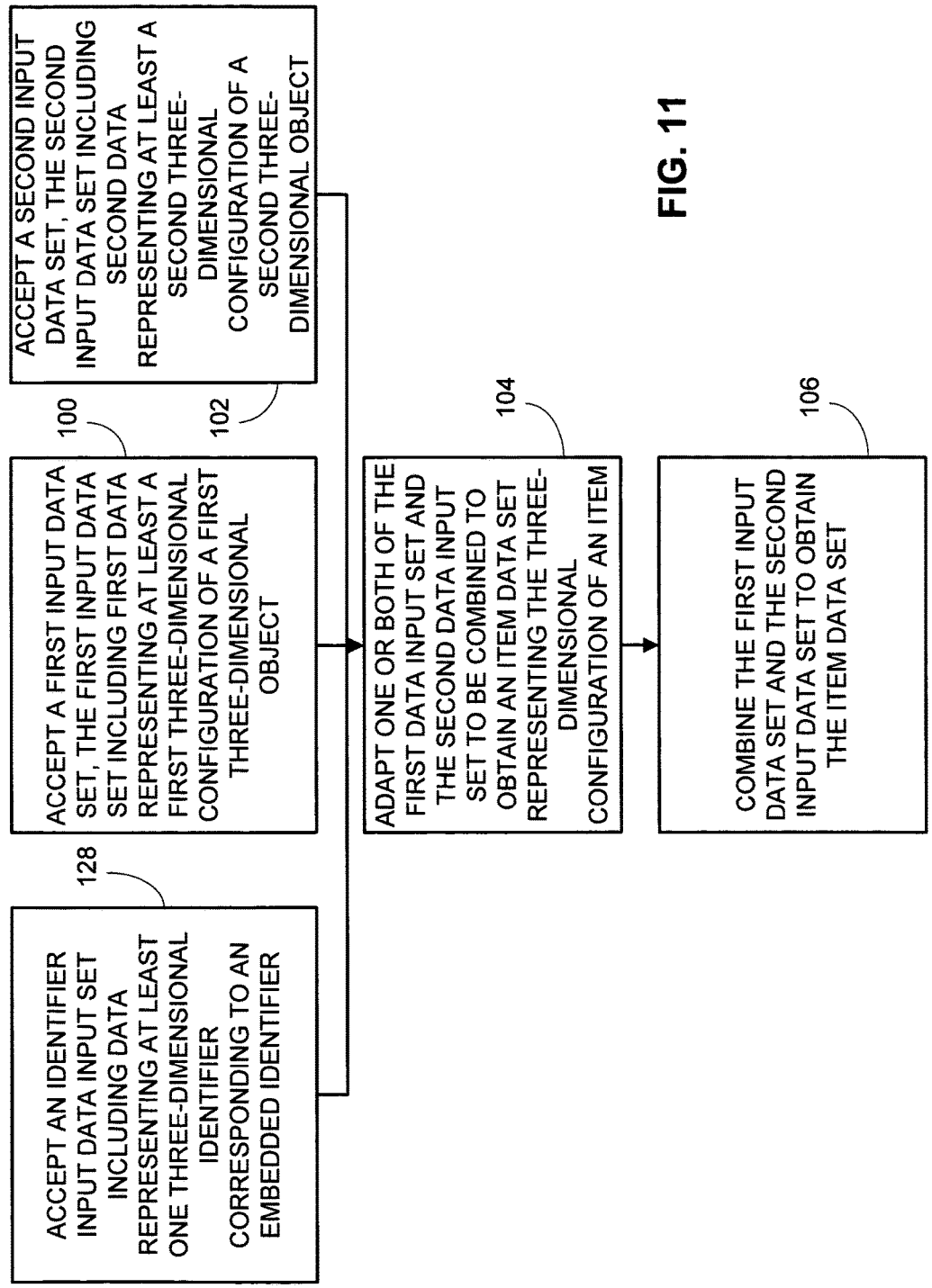
FIG. 11 is a flow chart depicting another embodiment.

FIG. 11 illustrates another embodiment including steps 100, 102, 106 and 108 which further includes accepting an identifier input data set including data representing at least one three-dimensional identifier configuration corresponding to an embedded identifier (step 128).

Figure 1A:
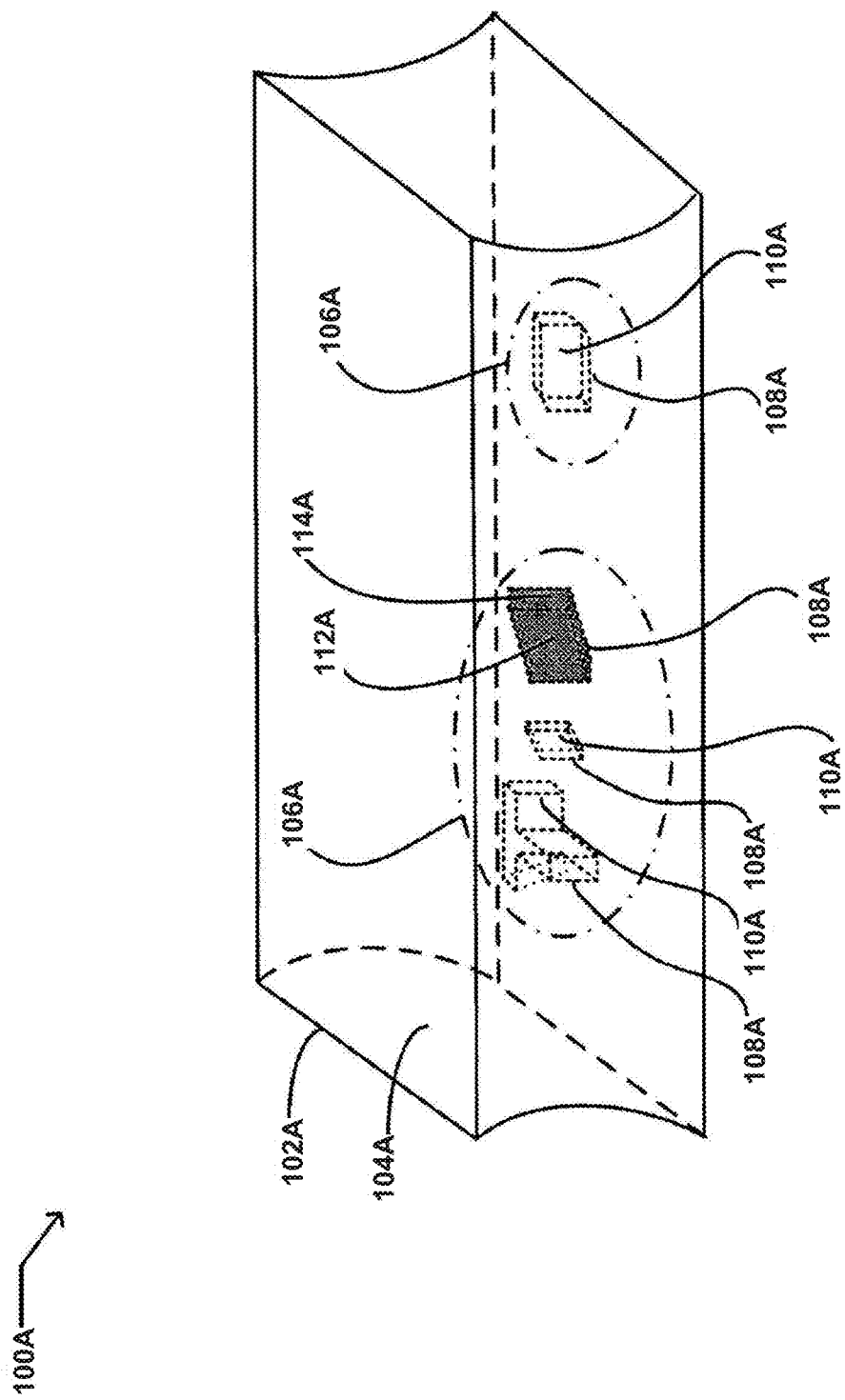

Embedded identifiers are discussed in U.S. patent application Ser. No. 10/802,106, filed Mar. 16, 2004. FIG. 1A shows one embodiment where an item 100A includes an outer part 102A that itself includes at least one outer material 104A, and an identifier 106A that includes at least one three-dimensional configuration 108A corresponding to the identifier 106A. In FIG. 1A, the exterior of item 100A is shown with edges of the item 100A obstructed from view by the body of item 100A, shown as broken lines. In addition, FIG. 1A shows internal features, the identifier 106A and three-dimensional configurations 108A, outlined in broken lines. The oval broken outlines representing the identifiers 106A contain representative three-dimensional configuration or configurations 108A. The three-dimensional configuration or configurations 108A are embedded within the outer material or materials 104A. The three-dimensional configuration or configurations 108A are either (1) a substantially empty cavity or cavities 110 in the outer material or materials 104A, or (2) one or more identifying materials 112A that fill part or all of a cavity 114A in the outer material or materials 104A, or both (1) and (2).

The substantially empty cavities 110A, the identifying material or materials 112A, and the cavity 114A filled by one or more identifying materials 112A are indicated as the interiors of the three-dimensional configurations 108A. In this embodiment, where one or more of the three-dimensional configuration or configurations 108A include an identifying material or materials 112A, filling all or part of the outer material or materials 104, the outer material or materials 104A are substantially opaque to visible light. The item 100A may be constructed such that three-dimensional configuration 108A is partially or completely surrounded by one or more first outer materials 104A, which one or more first outer materials 104A are themselves partially or completely surrounded by one or more second outer materials 104A. In a preferred embodiment, the item is the product of fabrication process generally known as rapid prototyping, but the skilled artisan will recognize that the invention is not limited to that fabrication process.

The identifier 106A may include a variety of types of information, such as information that identifies the item uniquely (e.g., a unique alphanumeric character sequence), information that identifies the item as a member of a set of similar items (e.g., an alphanumeric character sequence that identifies the item as a product made under license to a particular business entity, or as a product made any a particular manufacturer). The three-dimensional configuration or configurations 108A that correspond to the identifier 106A may be literal depictions of alphanumeric characters, or they may be shapes that correspond to the identifier 106A that are not ascertainable as such upon visual inspection. Those who wish to copy an item that represents this embodiment may not discern the significance or the meaning of the three-dimensional configuration or configurations 108A if those configurations 108A are detected in an item to be copied. As such, the configurations 108A provide a means of detecting unauthorized copies of item embodiments.

Figure 12:
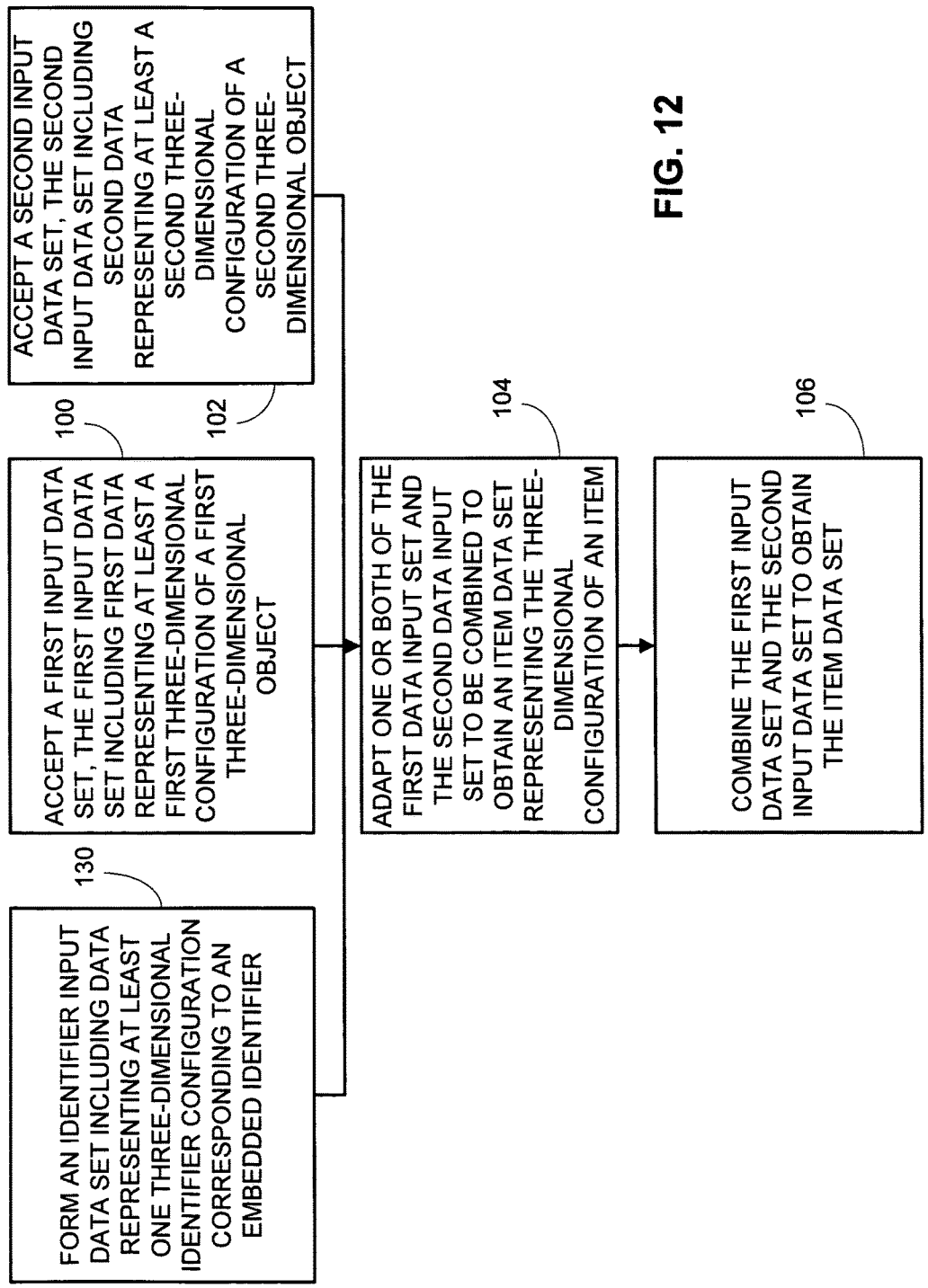
FIG. 12 is a flow chart depicting another embodiment.
Figure 13:
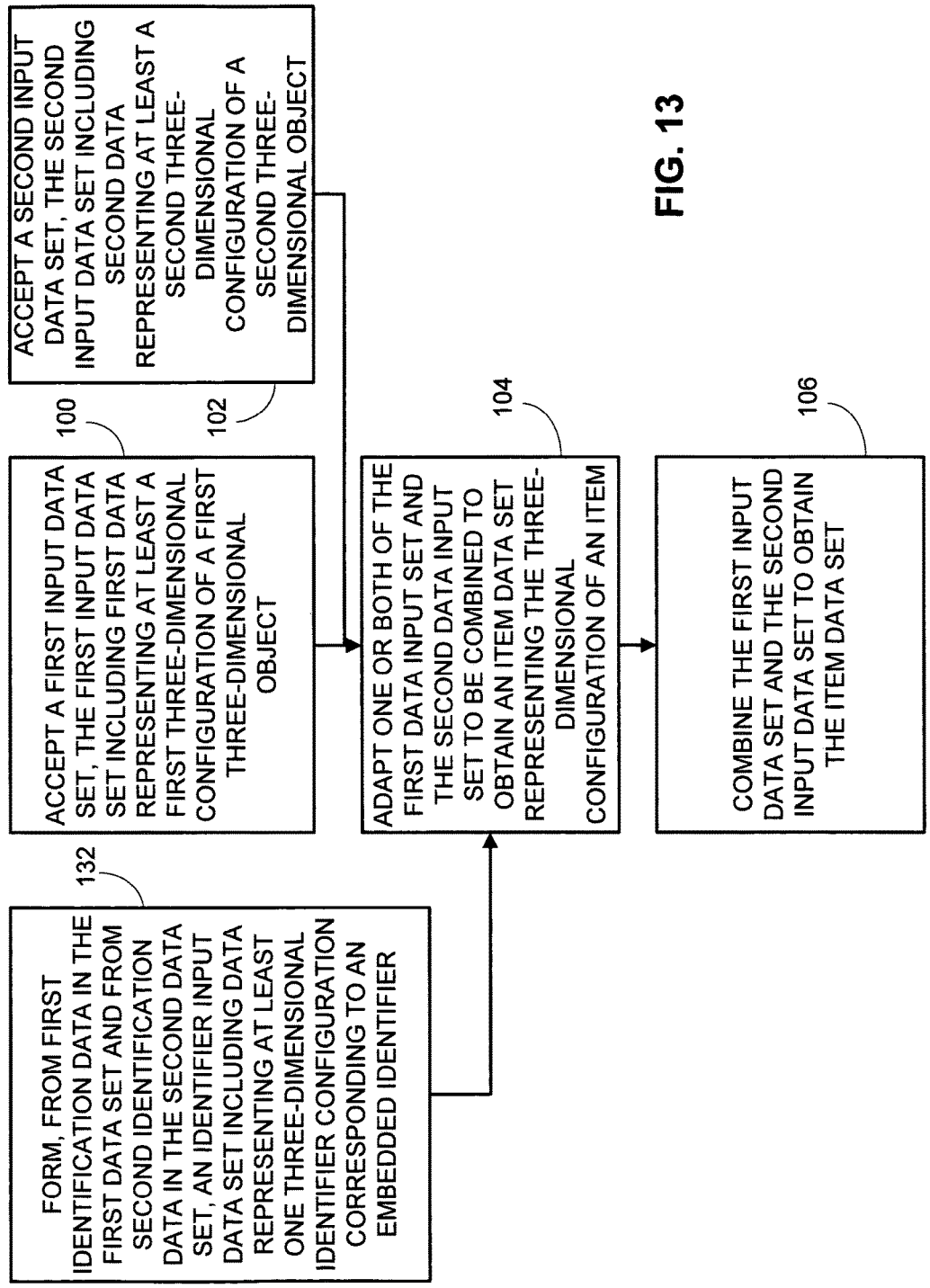
FIG. 13 is a flow chart depicting another embodiment.

As shown in FIG. 12, yet another embodiment including steps 100, 102, 106 and 108 further includes forming an identifier input data set including data representing at least one three-dimensional identifier configuration corresponding to an embedded identifier (step 130). As illustrated in FIG. 13, still another embodiment including steps 100, 102, 106 and 108 further includes forming from first identification data and second identification data an identifier input data set including data representing at least one three-dimensional identifier configuration corresponding to an embedded identifier, where the first input data set includes the first identification data and the second input data set includes the second identification data (step 132).

Figure 14:
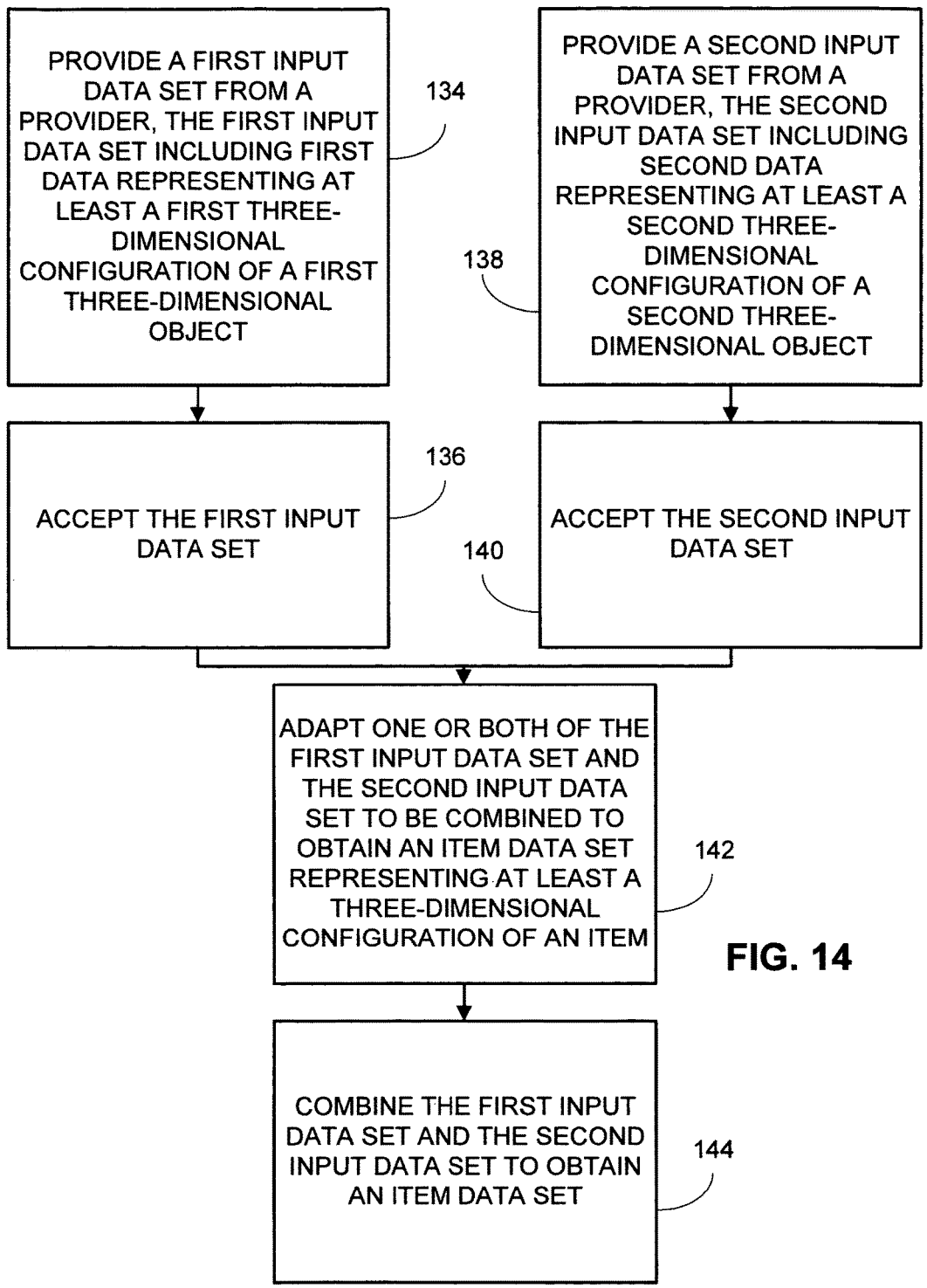
FIG. 14 is a flow chart depicting another embodiment.

FIG. 14 illustrates one embodiment, a method for producing an item data set representing the three-dimensional configuration of an item, which includes providing a first input data set from a first provider, the first input data set including first data representing at least a first three-dimensional configuration of a first three-dimensional object (step 134); accepting the first input data set (step 136); providing a second input data set from a second provider, the second input data set including second data representing at least a second three-dimensional configuration of a second three-dimensional object (step 138); accepting the second input data set (step 140); adapting the first data input set and the second data input set to be combined to obtain an item data set representing at least a three-dimensional configuration of the item (step 142); and combining the first input data set and the second input data set to obtain the item data set (step 144). Steps 134 and 136, taken together, may be performed before, after, simultaneously with, or partially simultaneously with steps 138 and 140 taken together. The first provider and the second provider may be the same person or entity, and the either or both of the first provider and the second provider may be a customer of a business using the method or making the method available for use by a customer. In one example, the first provider may be a customer who may be located remotely from the business, may be at the location of the business, or may be located at a designated input location, such as a kiosk.

In one alternative, a user interface may present to the user a representation of the three-dimensional configuration of the item and provide a set of options to the user. For example, the user may approve of the item or may elect to modify one or more portions of the item. If the user elects to modify the item, the user interface may then provide updated financial transaction and scheduling information to the user and may permit additional user input such as transaction approval.

Generally, in the figures herein, where two or more parallel branches of a flow chart are shown, the steps on any of the parallel branches may be performed before, after, simultaneously with, or partially simultaneously with the steps on the other branch or branches.

Various embodiments including steps 134, 136, 138, 140, 142 and 144 may include one or more of the steps and features discussed above in conjunction with steps 100, 102, 104 and 106.

Figure 15:
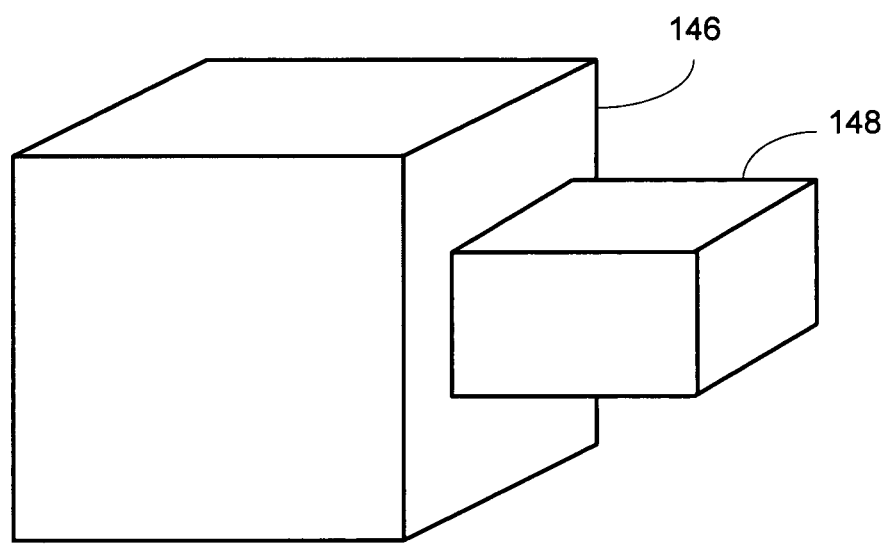
FIG. 15 is an isometric view of another embodiment.

Another embodiment, shown in FIG. 15, is an article of manufacture including at least one first feature 146 shaped according to a first data set, the first data set including at least three-dimensional configuration data for the at least one first feature and at least one second feature 148 shaped according to a second data set, the second data set including at least three-dimensional configuration data for the at least one second feature, where one or both of the first data set and the second data set are adapted to be combined with each other to yield the at least one first feature and the at least one second feature as integral portions of the article of manufacture. In one embodiment, the first feature and the second feature are shaped using rapid prototyping.

Figure 16:
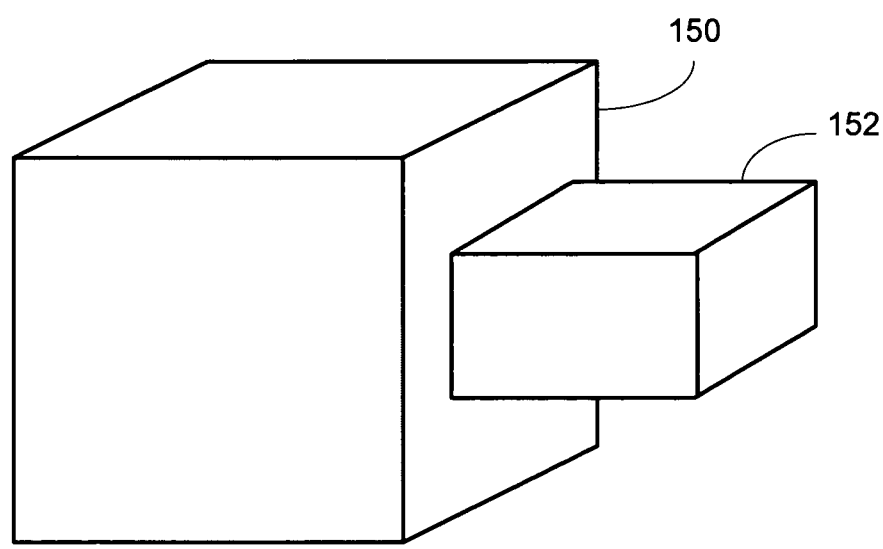
FIG. 16 is an isometric view of another embodiment.

Yet another embodiment, shown in FIG. 16, is an article of manufacture including at least one first feature shaped 150 according to a first data set, the first data set being provided by a first provider and including at least a first three-dimensional configuration of the at least one first feature, and at least one second feature 152 shaped according to a second data set, the second data set being provided by a second provider and including at least a second three-dimensional configuration of the at least one second feature, where one or both of the first data set and the second data set are adapted to be combined with each other to yield the at least one first feature and the at least one second feature as integral portions of the article of manufacture. In one embodiment, the first feature and the second feature are shaped using rapid prototyping.

One skilled in the art will recognize that the foregoing components (e.g., steps), devices, and objects in FIGS. 1-16 and the discussion accompanying them are used as examples for the sake of conceptual clarity and that various configuration modifications are common. Consequently, as used herein, the specific exemplars set forth in FIGS. 1-16 and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

While particular embodiments of the subject matter of this application have been shown and described, it will be obvious to those skilled in the art that, based upon the teaching herein, changes and modifications may be made without departing from the subject matter and its broader aspects and, therefore, the appended claims are to encompass within their scope all such changes and modifications as are within the true spirit and scope of the subject matter. Furthermore, it is to be understood that the subject matter of this application is solely defined by the appended claims.

Other embodiments are within the following claims.

We claim:

1. A system for manufacturing a physical item, the system comprising:
    circuitry for capturing one or more digital photographic images of at least a portion of a first three-dimensional object;
    circuitry for deriving a first input data set representing the at least a portion of the first three-dimensional object from the one or more digital photographic images of the at least a portion of the first three-dimensional object, the first input data set being configured to enable the system to manufacture the at least a portion of the first three-dimensional object;
    circuitry for receiving a second input data set representing a second three-dimensional object, wherein the second three-dimensional object is user-selected after the first input data set is derived, the second input data set being configured to enable the system to manufacture the second three-dimensional object;
    circuitry for adapting for combination at least one of the first input data set representing the at least a portion of the first three-dimensional object or the second input data set representing the second three-dimensional object;
    circuitry for combining the first input data set representing the at least a portion of the first three-dimensional object with the second input data set representing the second three-dimensional object to obtain an item data set, the item data set being configured to enable the system to manufacture the physical item, the item data set further including at least identifier information defining at least one three-dimensional identifier that identifies the physical item, the at least one three-dimensional identifier to be embedded within the physical item; and
    circuitry for manufacturing the physical item from the item data set.

2. The system of claim 1, wherein the circuitry for capturing one or more digital photographic images of at least a portion of a first three-dimensional object includes:
    circuitry for capturing a plurality of digital photographic images of the at least a portion of the human figure each representing a respective region of the at least a portion of the human figure, and
    wherein the circuitry for deriving a first input data set representing the at least a portion of the first three-dimensional object from the one or more photographic images of the at least a portion of the first three-dimensional object includes:
    circuitry for deriving a first input data set representing the at least a portion of the human figure from the plurality of digital photographic images.

3. The system of claim 1, further comprising:
    circuitry for receiving, by way of a communications link, at least one of: the one or more photographic digital images, the first input data set, the second input data set, or the item data set.

4. The system of claim 3, wherein the communications link includes a wireless communications link.

5. The system of claim 4, wherein the circuitry for receiving, by way of the communications link, includes:
    circuitry for receiving the first input data set in response to a source of the second input data set being placed within an operational range of a wireless communications port operably coupled to the wireless communications link.

6. The system of claim 1, wherein the circuitry for adapting for combination at least one of the first input data set representing the at least a portion of the first three-dimensional object or the second input data set representing the second three-dimensional object includes:
    circuitry for performing one or more interpolations of at least a portion of at least one of the first input data set or the second input data set via at least one computer model to render one or more attributes of the computer model mutually compatible with the at least a portion of the first three-dimensional object or the second three-dimensional object.

7. The system of claim 1, wherein circuitry for receiving a second input data set representing a second three-dimensional object includes: circuitry for receiving the second input data set via the Internet.

8. The system of claim 1, wherein the circuitry for receiving a second input data set representing a second three-dimensional object includes:
    circuitry for displaying, to a user, a plurality of indicators each representing a three-dimensional object;
    circuitry for receiving a user selection of associated with an indicator representing a three-dimensional object; and
    circuitry for receiving a second input data set representing a user-selected three-dimensional object.

9. The system of claim 1, further comprising
    circuitry for accepting an identifier input data set representing at least one three-dimensional identifier configuration corresponding to an identifier configured to be embedded within the physical item.

10. The system of claim 9, further comprising:
    circuitry for forming at least one portion of the physical item from at least one structural material; and
    circuitry for enclosing within the at least one structural material, integrally with the forming the at least one portion, a void substantially shaped as at least one three dimensional configuration corresponding to identifying information that identifies the physical item, the void being defined by the at least one structural material.

11. The system of claim 1, further comprising
circuitry for forming an identifier input data set including data representing at least one three-dimensional identifier configuration corresponding to an identifier configured to be embedded within the physical item.

12. The system of claim 1, wherein the first input data set includes first identification data and the second input data set includes second identification data, the system further comprising:
circuitry for forming an identifier input data set including data representing at least one three-dimensional identifier configured to be embedded within the physical item from the first identification data and the second identification data.

13. The system of claim 1, wherein at least one of the first input data set or the second input data set includes data defining a void enclosed within one or more structural materials, the void being substantially shaped as one or more three-dimensional configurations that correspond to identifying information that identifies the physical item.

14. The system of claim 1, wherein at least one of the first input data set or the second input data set includes data defining one or more identifying materials to be enclosed within the void, the one or more identifying materials being substantially shaped as one or more three-dimensional configurations that correspond to identifying information that identifies the physical item.

15. A system for manufacturing a physical item, the system comprising:
at least one computing device; and
instructions that, when implemented in the at least one computing device, configure the at least one computing device for performing operations including at least:
receiving a first input data set from a first provider, the first input data set representing a first three-dimensional configuration of at least a portion of a human figure, the first input data set derived from capturing one or more digital photographic images of at least a portion of the human figure, the first input data set being configured to enable the system to manufacture at least a portion of the physical item shaped like the at least a portion of the human figure;
receiving a second input data set from a second provider different from the first provider, the second input data set representing a second three-dimensional configuration of a second three-dimensional object, the second input data set being configured to enable the system to manufacture the second three-dimensional object, wherein the second three-dimensional object is user-selected after the first input data set is derived, and wherein the second three-dimensional object is user-selected after the first input data set is received;
adapting for combination at least one of the first input data set representing the at least one of a portion of the human figure or the second input data set representing the second three-dimensional configuration of the second three-dimensional object;
combining the first input data set representing the at least a portion of the human figure with the second input data set representing the second three-dimensional object to obtain an item data set, the item data set being configured to enable the system to manufacture the physical item, the item data set further including at least identifier information defining at least one three-dimensional identifier that identifies the physical item, the at least one three-dimensional identifier to be embedded within the physical item; and
controlling a rapid prototyping device to manufacture the physical item using the item data set.

16. The system of claim 15, wherein the at least one computing device includes at least one port adapted to receive a non-volatile memory including at least one of the first input data set and the second input data set.

17. The system of claim 15, wherein the receiving a first input data set from a first provider includes, receiving the first input data set in response to a source of the first input data set being placed within operational range of a wireless communications link associated with the at least one computing device.

18. The system of claim 15, wherein at least a portion of the first data includes at least one parameter representing at least one attribute of the at least a portion of a human figure.

19. The system of claim 15, wherein at least a portion of the first data includes at least one datum representing a storage location for at least one parameter representing at least one attribute of the at least a portion of a human figure.

20. The system of claim 15, wherein the instructions further configure the at least one computing device for:
performing one or more interpolations of at least a portion of at least one of the first input data set or the second input data set via at least one computer model to render one or more attributes of the computer model mutually compatible with both the at least a portion of a human figure first and the second three-dimensional object.

21. The system of claim 15, wherein the instructions further configure the at least one computing device for:
receiving the first input data set via the Internet.

22. The system of claim 15, wherein the instructions further configure the at least one computing device for:
presenting a set plurality of three-dimensional objects to a user; and
receiving a user selection of the plurality of three-dimensional objects.

23. The system of claim 15, wherein the instructions further configure the at least one computing device for:
receiving an identifier input data set representing at least one three-dimensional identifier configuration corresponding to an identifier configured to be embedded within the physical item.

24. The system of claim 23, wherein the instructions further configure the at least one computing device for:
producing a physical item including the at least one three-dimensional identifier configuration embedded at least partially within the physical item.

25. The system of claim 15, wherein the instructions further configure the at least one computing device for:
forming an identifier input data set including data representing at least one three-dimensional identifier configuration corresponding to an identifier configured to be embedded within the physical item.

26. The system of claim 15, wherein the first input data set includes first identification data and the second input data set includes second identification data, wherein the instructions further configure the at least one computing device for:
forming an identifier input data set including data representing at least one three-dimensional identifier configured to be embedded within the physical item from the first identification data and the second identification data.

27. The system of claim 15, wherein controlling a rapid prototyping device to manufacture the physical item using the item data set includes:
producing a physical item including the at least one three-dimensional identifier configuration embedded at least partially within the physical item.

* * * * *